(12) United States Patent
Ito et al.

(10) Patent No.: US 11,018,383 B2
(45) Date of Patent: May 25, 2021

(54) BATTERY PACK

(71) Applicant: Kubota Corporation, Osaka (JP)

(72) Inventors: Hirokazu Ito, Sakai (JP); Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 224 days.

(21) Appl. No.: 15/605,994

(22) Filed: May 26, 2017

(65) Prior Publication Data

US 2018/0069275 A1  Mar. 8, 2018

(30) Foreign Application Priority Data

Sep. 7, 2016  (JP) .............................. JP2016-174715

(51) Int. Cl.
*H01M 10/48* (2006.01)
*H01M 50/20* (2021.01)
*H01M 50/502* (2021.01)

(52) U.S. Cl.
CPC ......... *H01M 10/482* (2013.01); *H01M 50/20* (2021.01); *H01M 50/502* (2021.01); *H01M 10/486* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2011/0206948 A1* | 8/2011 | Asai | ..................... | H01M 2/0473 429/7 |
| 2012/0115014 A1* | 5/2012 | Park | ...................... | H01M 2/206 429/159 |
| 2012/0115015 A1* | 5/2012 | Park | ........................ | H01M 2/20 429/159 |
| 2012/0328920 A1* | 12/2012 | Takase | ................ | H01M 2/1077 429/90 |
| 2013/0273404 A1 | 10/2013 | Ochi et al. | | |
| 2014/0141301 A1* | 5/2014 | Aoki | ................... | H01M 10/482 429/90 |
| 2015/0144409 A1* | 5/2015 | Fujii | ................... | B60L 11/1879 180/65.1 |
| 2015/0270589 A1* | 9/2015 | Ejiri | .................... | H01M 10/647 429/72 |

FOREIGN PATENT DOCUMENTS

| | | |
|---|---|---|
| JP | 2001138753 A | 5/2001 |
| JP | 3785499 B2 | 6/2006 |
| JP | 2010118304 A | 5/2010 |
| JP | 2011181369 A | 9/2011 |
| JP | 201410984 A | 1/2014 |
| WO | 2012057322 A1 | 5/2012 |

* cited by examiner

*Primary Examiner* — Alix E Eggerding
(74) *Attorney, Agent, or Firm* — The Webb Law Firm

(57) ABSTRACT

A battery pack includes a plurality of battery modules stacked with connecting terminals disposed at predetermined positions, a holding unit for holding the plurality of battery modules under the stacked state, a plurality of conducting paths connecting corresponding connecting terminals, and a substrate connected to the holding unit. The plurality of conducting paths are provided integrally in the substrate and disposed to connect the corresponding connecting terminals in association with connection of the substrate to the holding unit.

4 Claims, 6 Drawing Sheets

BATTERY PACK

CROSS-REFERENCE TO RELATED APPLICATION

This application claims priority to Japanese Patent Application No. 2016-174715 filed Sep. 7, 2016, the disclosure of which is hereby incorporated in its entirety by reference.

BACKGROUND OF THE INVENTION

Field of the Invention

This invention relates to a battery pack.

Description of Related Art

For instance, Japanese Unexamined Patent Application Publication No. 2010-118304 discloses a conventional battery pack including a plurality of battery modules stacked with connecting terminals disposed at predetermined positions, a holding unit for holding the plurality of battery modules under the stacked state, and a plurality of conducting paths connecting corresponding connecting terminals. This battery pack includes the plurality of battery modules (secondary batteries) that are stacked and electrodes of adjacent battery modules are connected via a bus bar (conductive plate) acting as a conducting path and bolt-connected to respective electrodes.

Further, Japanese Unexamined Patent Application Publication No. 2011-181369 discloses a laminate type battery module (a set of connected cells) configured such that a plurality of laminate cells accommodating cell bodies within flexible sheet-like containers are stacked. In this laminate type battery module, a plurality of laminate cells are held under a stacked state by a holding frame. Sheet-like positive electrodes in the respective laminate cells are joined to each other via a positive side connecting member and also sheet-like negative electrodes are joined to each other via a negative side connecting member. Further, with this battery pack (laminate cell structure), the plurality of battery modules are integrated to each other under the stacked state by a plurality of fastening members. And, the positive side connecting members and the negative side connecting members of the adjacent battery modules are connected via a bus bar.

With the above-described arrangements disclosed in JP2010-118304 and JP2011-181369, when the battery pack is to be manufactured, this requires a worker's taking trouble of individually connecting the electrodes of adjacent battery modules by a corresponding bus bar. Namely, there remains room for improvement in making the manufacturing of a battery pack easier.

And, with the arrangement disclosed in JP2010-118304, a plurality of bus bars act also as connecting members for integrally connecting the plurality of battery modules together. With this, when mounted on a work vehicle which experiences violent vibration at the time of traveling for instance, relative displacements among the respective battery modules due to e.g. vibration during traveling is prevented by the respective bus bars. Namely, the stress due to e.g. vibration during traveling will be applied in a concentrated manner onto the respective bus bar, so that the risk of damage of the respective bus bar, electrodes, etc. will increase.

On the other hand, in the case of the arrangement disclosed in JP2011-181369, since there is provided a fastening member for integrating the plurality modules under the stacked state, when mounted on a work vehicle e.g., relative displacement among the respective battery modules due to e.g. vibration during traveling can be prevented by the fastening member.

However, since the electrodes of adjacent battery modules are connected individually by the corresponding bus bar, when the battery pack is vibrated due to e.g. influence of vibration at the time of traveling, the battery module having a large mass and the bus bar having a small mass will vibrate with different cycles or amplitudes from each other. Thus, the stress due to e.g. vibration at the time of traveling will tend to be applied in a concentrated manner to the vicinity of the electrodes of the respective battery module, thus possibly inviting the inconvenience of damage in the vicinities of the electrodes of the respective battery module.

Namely, there is a need for facilitating manufacture of a battery pack and also allowing avoidance of damage in the battery pack due to e.g. vibration at the time of traveling.

SUMMARY OF THE INVENTION

As a solution for accomplishing the above-noted object, a battery pack according to the present invention comprises:

a plurality of battery modules stacked with connecting terminals disposed at predetermined positions;

a holding unit for holding the plurality of battery modules under the stacked state;

a plurality of conducting paths connecting corresponding connecting terminals; and a substrate connected to the holding unit;

wherein the plurality of conducting paths are provided integrally in the substrate and disposed to connect the corresponding connecting terminals in association with connection of the substrate to the holding unit.

With this solution, when the battery pack is to be manufactured, a worker will stack the plurality of battery modules with connecting terminals disposed at predetermined positions and then cause this stacked state to be held by the holding unit and then connect the substrate to the holding unit. With this, the corresponding connecting terminals of the plurality of battery modules are connected appropriately via the respective conducting paths of the substrate. Thus, in comparison with the case of individually connecting the respective corresponding connecting terminals via a plurality of individually formed bus bars, the trouble required for connection of the corresponding connecting terminals can be lessened.

And, the plurality of battery modules under the state of their corresponding respective connecting terminals being connected via the respective conducting paths of the substrate will not only be held under the stacked state by the holding unit, but also will be kept connected under the stacked state by the substrate. Therefore, when this battery pack is mounted on a work vehicle which is exposed to violent vibration such as vibration during traveling, relative displacements among the respective battery modules due to e.g. vibration during traveling can be favorably suppressed by the holding unit and the substrate. With this, it becomes possible to avoid the risk of stress concentration in the vicinity of connecting terminals of the respective battery modules caused by relative displacements among the respective battery modules, thus avoiding the risk of damage to the respective battery modules by such stress concentration.

Moreover, when vibration occurs in the battery module due to e.g. influence of vibration during traveling, irrespectively of the masses of the battery modules and the substrate, the substrate having a plurality of conducting paths and the plurality of battery modules connected by via this substrate will vibrate together. Thus, the above inventive arrangement can avoid the risk that would occur in the case of the conventional arrangement in which the corresponding connecting terminals are connected via a plurality of bus bars, namely, the risk that the battery modules and the respective bus bars having different masses from each other vibrate individually with different cycles or amplitudes from each other, thus inviting concentration of stress to the vicinity of connecting terminals of the respective battery modules. Accordingly, the risk of damage of the respective battery module due to such stress concentration can be avoided.

Consequently, manufacturing of a battery pack is made easy and at the same time, the risk of damage to the battery pack due to vibration during traveling for instance can be avoided.

According to one preferred solution provided by this invention:

the holding unit includes a pair of end plates disposed at opposed ends of the battery module in a stacking direction thereof, and the substrate is provided between the pair of end plates.

With this solution, it is possible to cause the substrate to function as a reinforcing member for increasing the shape retainability of the holding unit.

Thus, the rigidness of the battery pack can be enhanced.

According to a further preferred solution provided by the present invention:

the substrate is divided in the stacking direction of the battery module.

With this solution, at a dividing portion of the substrate, there can be secured a gap that allows change in volume of each battery module in the stacking direction in association with charging and discharging.

Thus, it becomes possible to avoid a risk of generation of distortion in the connecting terminal vicinity of each battery module whose connecting terminals are connected to the substrate, due change in volume of each battery module in the stacking direction.

According to a further preferred solution provided by the present invention:

the battery pack further comprises:

a controller for controlling the battery modules;

a first connector connected to the controller via a wire harness;

a second connector detachably connected to the first connector; and a plurality of detecting paths extending between the conducting paths and the second connector;

wherein the second connector and the plurality of detecting paths are provided integrally in the substrate.

With this solution, when a wiring operation for connecting the controller to the respective conducting path is to be effected, the worker can connect the controller to the respective conducting path by connecting the first connector on the controller side to the second connector.

In the above regard, if the plurality of detecting paths were a plurality of wire harnesses connected simply to the second connector, this would require the trouble for the worker to individually connect the respective wire harness to the respective corresponding conducting path. Whereas, the above solution allows connection between the controller and the respective conducting path without requiring such trouble.

As a result, wiring operation in the manufacturing of a battery pack can be made easy.

the battery pack further comprises:

a controller for controlling the battery modules; and a plurality of detecting paths extending between the controller and the conducting paths;

wherein the controller and the plurality of detecting paths are provided integrally in the substrate.

With the above solution, in manufacturing of a battery pack, an installing operation of a controller and a wring operation for connecting the controller to the respective conducting path can be eliminated.

As a result, the manufacturing of a battery pack can be made even easier.

DETAILED DESCRIPTION OF THE PREFERRED EMBODIMENTS

Next, as an example of embodiment of the present invention, there will be explained an embodiment in which a battery pack according to the present invention is mounted on an electrically powered grass mower as an example of a work vehicle.

Figure 1:
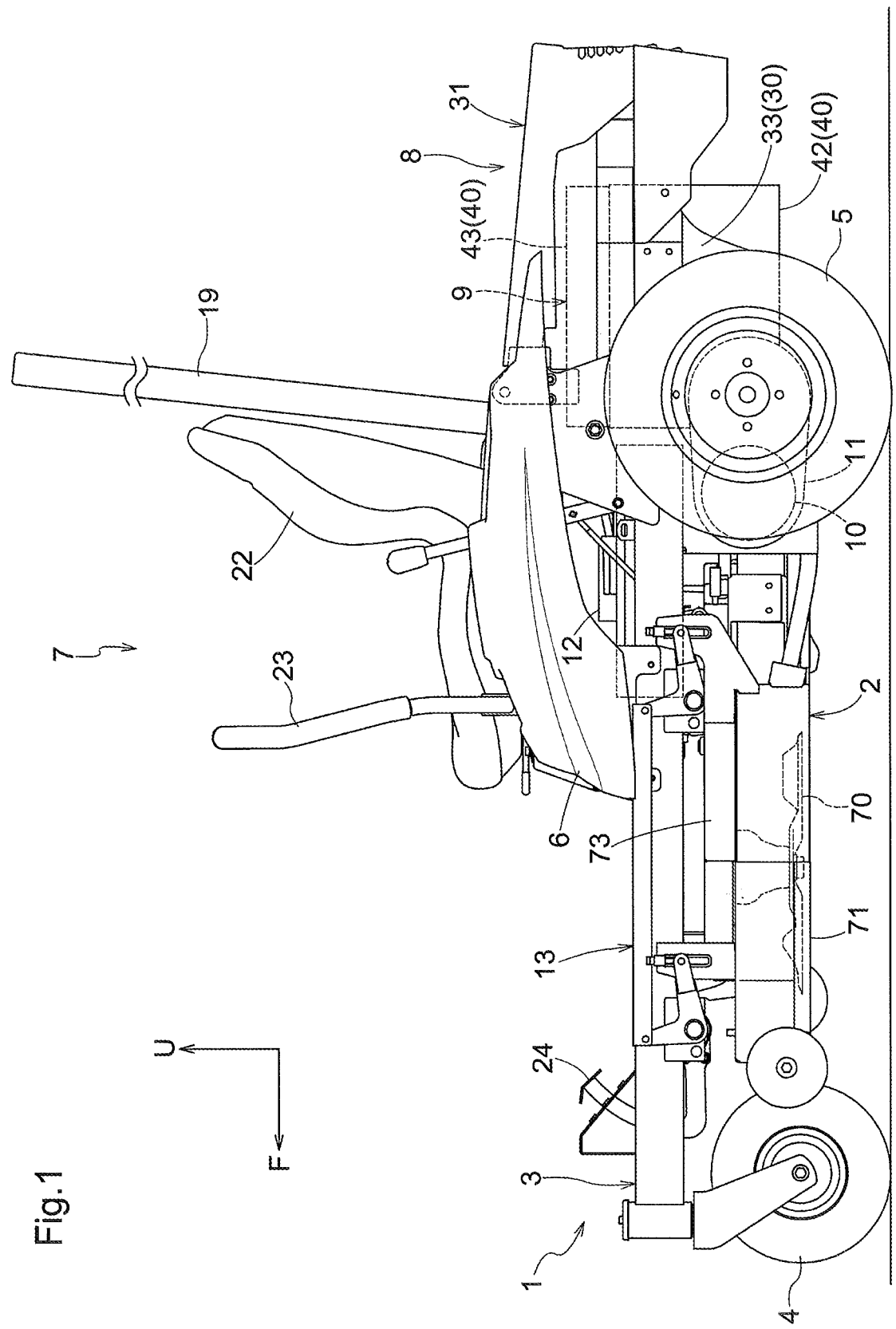
FIG. 1 is a left side view of an electrically powered grass mower on which a battery pack is mounted.

Incidentally, a direction denoted by a mark F shown in FIG. 1 represents a front side of the electrically powered grass mower, and a direction denoted by a mark U represents a rear side of the electrically powered grass mower.

Figure 2:
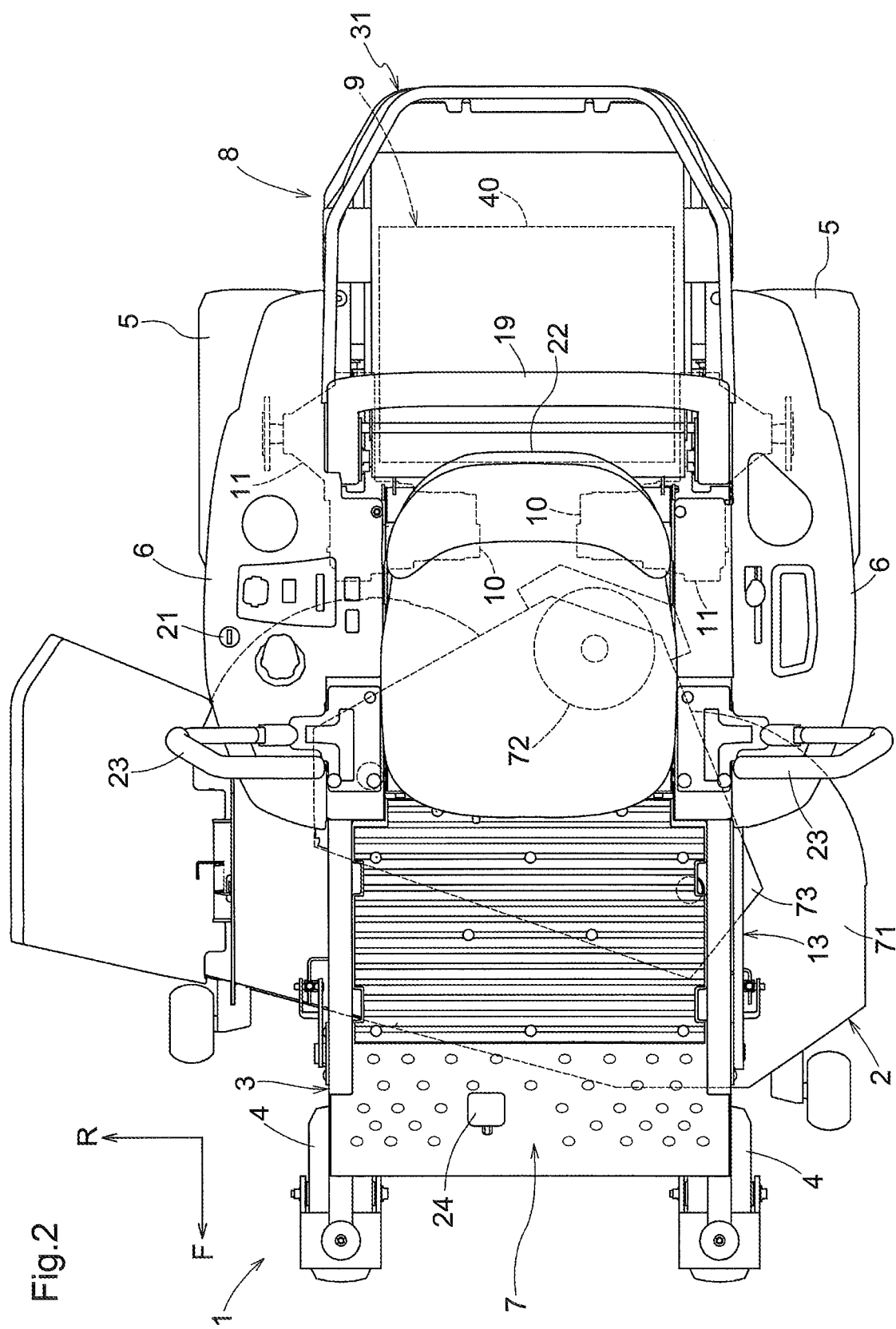
FIG. 2 is a plane view of the electrically powered grass mower on which the battery pack is mounted.

Further, a direction denoted by a mark F shown in FIG. 2 represents the front side of the electrically powered grass mower, and a direction denoted by a mark R represents a right side of the electrically powered grass mower.

As shown in FIGS. 1 and 2, an electrically powered grass mower illustrated in this embodiment includes a riding type traveling vehicle body 1, a mower unit 2 supported by suspension from a front/rear intermediate lower portion of the traveling vehicle body 1 to be lifted up/down, and so on.

The traveling vehicle body 1 includes a vehicle body frame 3 forming a framework of the traveling vehicle body 1, caster type left and right front wheels 4, independently speed-changeable and drivable left and right rear wheels 5, left and right fenders 6 for covering the left and right rear wheels 5, a riding type driving section 7 disposed at a front portion of the traveling vehicle body 1, a battery accommodating portion 8 disposed at a rear portion of the traveling vehicle body 1, a battery pack 9 accommodated in the battery accommodating portion 8, left and right first electric motors 10 for traveling, left and right gear type speed reducing devices 11 for transmitting speed-reduced power from the left and right first electric motors 10 to the left and right rear wheels 5, an electronic control unit (to be referred to as "ECU 12" hereinafter) for controlling operations of the left and right first electric motors 10, etc., a parallel-link type link mechanism 13 for supporting and suspending the mower unit 2 to be liftable up/down, and so on.

The vehicle body frame 3 includes an arch-shaped protecting frame 19, etc. The left and right front wheels 4 are supported to front end portions of the vehicle body frame 3 to be changeable in their orientations. The left and right rear wheels 5 receive power from the left and right first electric motors 10 via the left and right gear type speed reducing devices 11. The first electric motors 10 receive electric power from the battery pack 9.

The driving section 7 includes a key switch 21 for allowing or blocking electric power supply from the battery pack 9 to e.g. the ECU 12, a driver's seat 22 supported at a front/rear intermediate portion of the vehicle body frame 3, left and right speed changer levers 23 disposed on the left and right sides of the driver's seat 22, a lift pedal 24 disposed at a foot portion of the driving section 7, and so on.

The left and right speed changer levers 23 are pivotal operation type and operational positions thereof are inputted to the ECU 12 via left and right lever sensors (not shown). In response to inputs from the left and right lever sensors, the ECU 12 executes traveling control for controlling outputs of the left and right first electric motors 10. By this traveling control, the worker, by pivotally operating the left and right speed changer levers 23, can switch over the traveling state of the traveling vehicle body 1 among a forward straight traveling state in which the left and right rear wheels 5 are driven to rotate forwardly at an equal speed, a forward turning state in which the left and right rear wheels 5 are driven to rotate at different speeds and forwardly, a reverse straight traveling state in which the left and right rear wheels 5 are driven to rotate at different speeds and reversely, a pivot turning state in which one of the left and right rear wheels 5 is kept stopped while the other of the left and right rear wheels 5 is driven to rotate forwardly or reversely and a spin turning state in which the left and right rear wheels 5 are driven to rotate at different directions from each other.

As shown in FIG. 1, the lift pedal 24 is operably coupled to the link mechanism 13. With this operative coupling, by stepping on the lift pedal 24, the worker can cause the mower unit 2 to be elevated an upper retracted position. Also, by releasing the stepping-on of the lift pedal 24, the worker can cause the mower unit 2 to be lowered to a lower working position.

Figure 3:
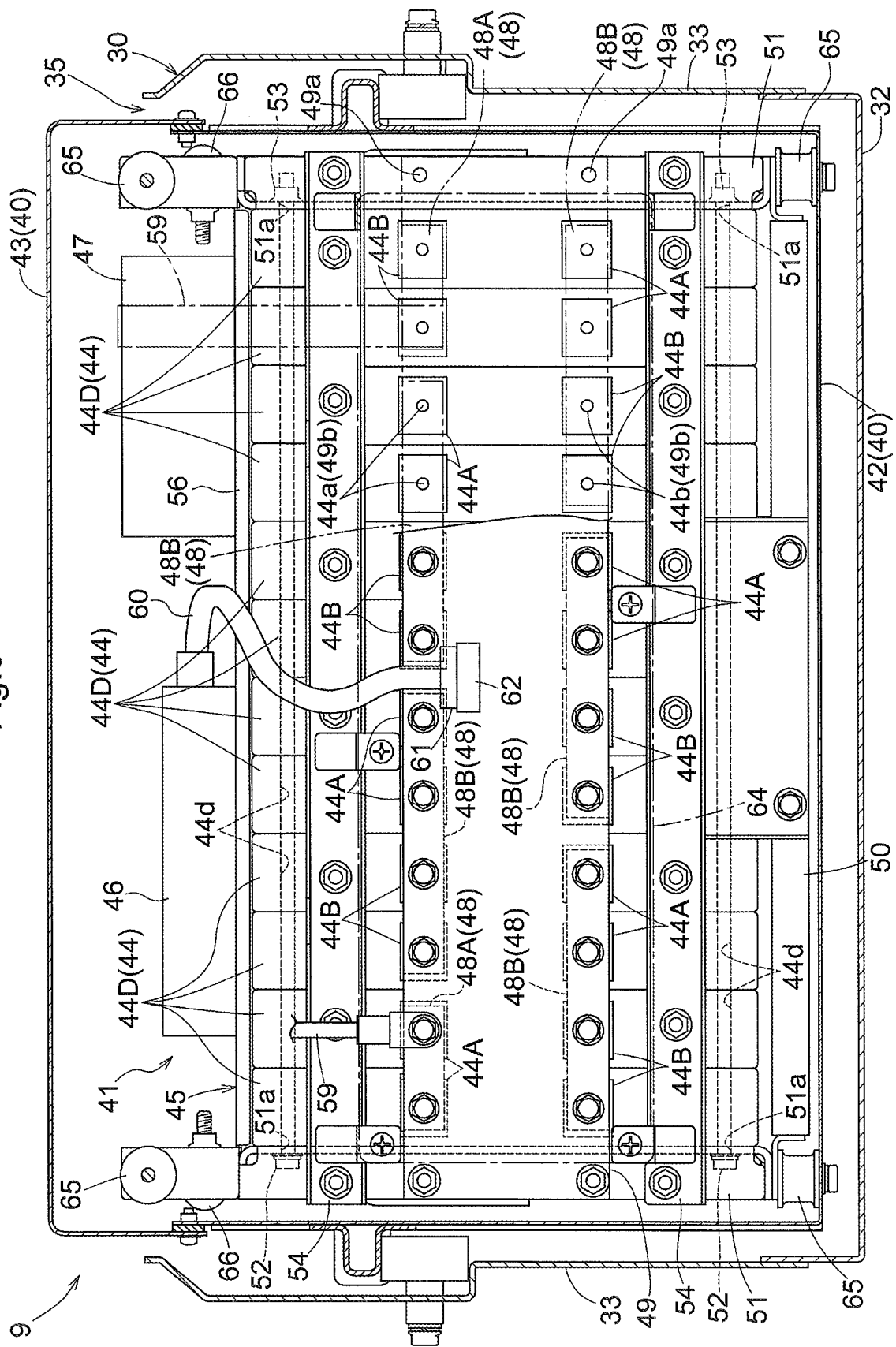
FIG. 3 is a front view in vertical section of principal portions, showing the battery pack accommodated in a battery accommodating portion.

As shown in FIGS. 1 through 3, the battery accommodating portion 8 includes a supporting unit 30 for supporting the battery pack 9, a rear opening type battery cover 31 vertically pivotally supported to the vehicle body frame 3, and so on. The supporting unit 30 includes a bottom plate 32, left and right side plates 33, and a front plate (not shown) thus forming a recessed space 35 for accommodating the battery pack. The battery cover 31 is vertically pivotable between a lower closing position for closing the recessed space 35 and an upper opening position for opening up the recessed space 35.

As show in FIGS. 1 and 2, the mower unit 2 is disposed between the left and right front wheels 4 and the left and right rear wheels 5. The mower unit 2 includes a plurality of blades 70 driven to rotate, a housing 71 for covering the respective blades 70 from above, a second electric motor 72 for utility work supported to a rear portion of the housing 71, a belt type transmission device (not shown) for transmitting power from the second electric motor 72 to the respective blades 70, a transmission cover 73 for covering the second electric motor 72 and the belt type transmission device, and so on. The second electric motor 72 receives electric power supply from the battery pack 9.

As shown in FIGS. 1 through 4, the battery pack 9 includes a battery case 40 having dust proof property and water proof property, a rechargeable type battery unit 41 accommodated in the battery case 40, and so on.

Figure 4:
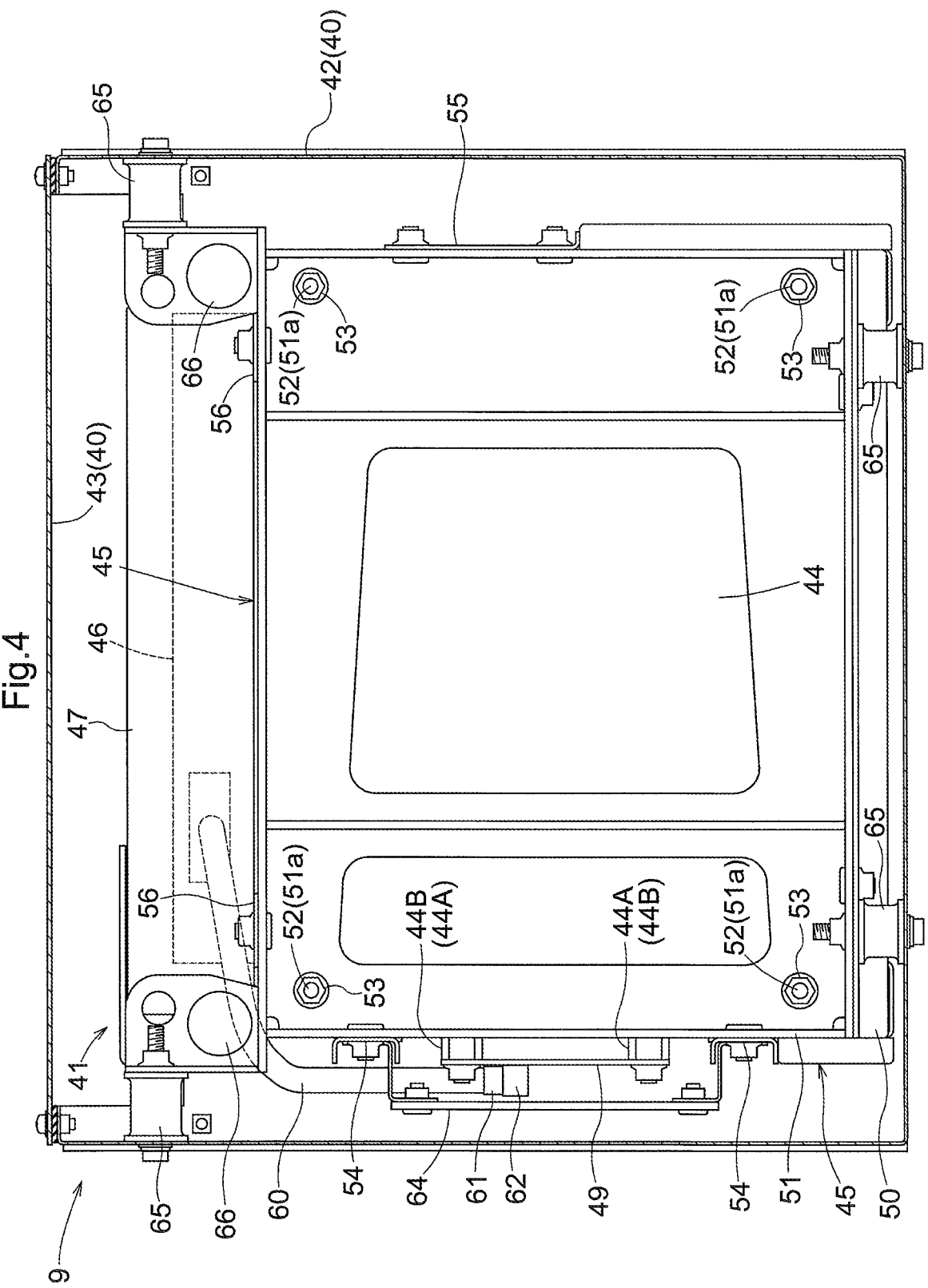
FIG. 4 is a left side view in vertical section of the battery pack showing an arrangement of the battery pack.

As shown in FIG. 1 and FIGS. 3-4, the battery case 40 includes an accommodating case 42 having an opened top, an accommodating cover 43 detachably attached to the top of the accommodating case 42, and so on.

With the above, accommodation of the battery unit 41 in the battery case 40 can be carried out easily.

Figure 5:
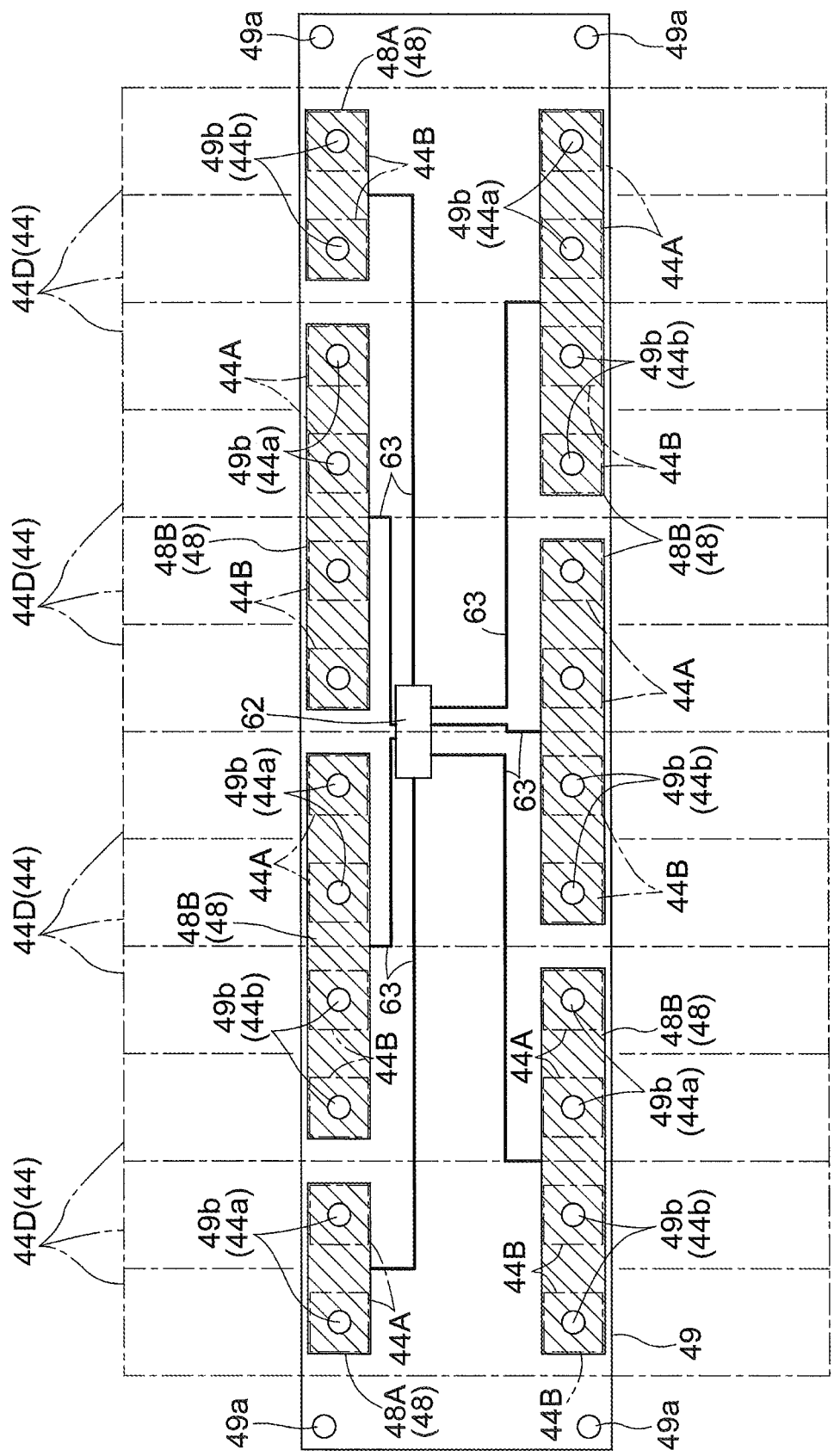
FIG. 5 is a rear view of a substrate showing an arrangement of the substrate.

As shown in FIGS. 3 through 5, the battery unit 41 includes twelve battery modules 44 stacked with respective connecting terminals 44A, 44B disposed at predetermined positions, a holding unit 45 for holding the twelve battery modules 44 under the stacked state, a controller 46 for controlling the respective battery modules 44, a junction box 47 supported to the holding unit 45, a plurality of conducting paths 48 for connecting the corresponding connecting terminals 44A, 44B, a substrate 49 connected to the holding unit 45, sensors such as an ammeter (not shown), a thermistor (not shown), etc., and so on.

The respective battery modules 44 are stacked in the left/right direction with the respective connecting terminals 44A, 44B being positioned at the front end portion of the battery unit 41. Each battery module 44 comprises a predetermined number of laminate type battery cells (not show) stacked on each other and accommodated in a cell case 44D formed of metal and having an approximately rectangular shape. Each battery module 44 includes, on its vertical center side of its front end portion, a positive electrode terminal 44A and a negative electrode terminal 44B. The respective connecting terminals 44A, 44B are formed by joining sheet-like terminals via a connecting member (not shown) in the respective battery cells stacked within a cell case. The respective connecting terminals 44A, 44*b* form screw holes 44*a*, 44*b* for connection with the conducting paths. Each cell case 44D defines position holding through holes 44*d* at its four corners as seen in the side view.

The holding unit 45 includes a base frame 50 having a rectangular shape in its plane view, left and right end plates 51 disposed at opposed ends in the stacking direction of the battery modules 44, four holding bolts 52 extending through the through holes 44*d* of the respective cell case 44D between the left and right end plates 51, eight nuts 53 to be threadingly fitted on the opposed ends of the respective holding bolts 52, upper and lower first bridging members 54 provided at the front ends of the left and right end plates 51, a single second bridging member 55 provided at the rear ends of the left and right end plates 51, and front and rear third bridging members 56 provided at the upper ends of the left and right end plates 51, etc.

The left and right end plates 51 are connected to the left and right opposed end portions of the base frame 50. The left and right end plates 51 are provided in the form of rectangular frames that define through holes 51*a* for the holding bolts at their four corners. Each holding bolt 52 is inserted into the through hole 44*d* of each cell case 44D and the through hole 51*a* of each end plate 51, and as the nuts 53 are threaded onto the opposed end portions of the respective holding bolt 52, each battery module 44 is held under the stacked state between the left and right end plates 51. The upper first bridging member 54 supports a front end upper portion of each battery module 44 from the front side thereof. The lower first bridging member 54 supports a front end lower portion of each battery module 44 from the front side thereof. The second bridging member 55 supports a rear end of each battery module 44 from the rear side thereof. The front and rear third bridging members 56 support the upper end of each battery module 44 from the upper side thereof.

The controller 46 is supported, together with the junction box 47, to the front and rear third bridging members 56. The controller 46 is a battery management system configured to monitor a voltage, a temperature or the like of each battery module 44 and to control its output accordingly. Through not shown, the controller 46 is connected to the ECU 12 via a communication line, a connector, or the like to be able to communicate with this ECU 12.

As shown in FIG. 3 and FIG. 5, the plurality of conducting paths 48 are arranged in such a manner to connect the corresponding connecting terminals 44A, 44B in association with connection of the substrate 49 to the holding unit 45 and are provided integrally with the substrate 49.

With the above, when the battery pack 9 is to be manufactured, a worker will stack the respective battery modules 44 with their connecting terminals 44A, 44B being disposed at the front end portion and then cause this stacked state to be held by the holding unit 45 and then connect the substrate 49 to the holding unit 45, thus assembling the battery unit 41. With this, the corresponding connecting terminals 44A, 44B of the respective battery modules 44 will be individually connected via the conducting paths 48 of the substrate 49 appropriately. Then, when this battery unit 41 is accommodated in the battery case 40, the manufacturing of the battery pack 9 is completed.

Namely, in comparison with a case e.g. wherein the corresponding connecting terminals 44A, 44B are individually connected via a plurality of bus bars formed independently, the trouble required for connection of the corresponding connecting terminals 44A, 44B can be reduced advantageously.

And, for the respective battery modules 44, when their corresponding connecting terminals 44A, 44B are connected via the respective conducting paths 48 of the substrate 49, the modules 44 are not only maintained under the stacked state by the holding unit 45, but also maintained under the connected state under the stacked state by the substrate 49. Therefore, at the time of traveling of the electrically powered grass mower, relative displacements among the respective battery modules 44 due to e.g. vibration at the time of traveling is suppressed. Thus, it becomes possible to avoid risk of the stress due to such relative displacements of the respective battery modules 44 being concentrated in the vicinity of the respective connecting terminals, so that the risk of damage to the respective battery modules 44 due to such stress concentration can be avoided.

Moreover, in case vibration occurs in the battery pack 9 due to influence of vibration at the time of traveling, irrespectively of the masses of the battery modules 44, the substrate 49, etc., the substrate 49 having the plurality of conducting paths 48 and the plurality of battery modules 44 connected via this substrate 49 will vibrate together. In the case of the conventional arrangement wherein the corresponding connecting terminals 44A, 44B are individually connected via a plurality of bus bars, the battery modules 44 and the respective bus bars would vibrate individually due to the masses thereof which are different from each other, thus resulting in stress concentration in the vicinity of the respective connecting terminals of the respective battery modules 44. The above arrangement can avoid such risk of stress concentration, and the resultant risk of damage to the respective battery modules 44 due to such stress concentration.

The substrate 49 is a printed circuit board having the plurality of conducting paths 48, etc. printed thereon. More particularly, on the substrate 49, as the plurality of conducting paths 48, there are printed two first conducting paths 48A and five second conducting paths 48B which together connect the twelve battery modules 44 in two in parallel and six in series with each other. Each first conducting path 48A has a short length extending between two positive electrode terminals 44A or negative terminals 44B adjacent each other on the left and right sides. Each second conducting path 48B has a long length extending between two positive electrode terminals 44A or negative electrode terminals 44B adjacent each other on the left and right sides. Each first conducting path 48A is connected to the junction box 47 via a power line 59 comprised of electric wires or conductive bars. The substrate 49 defines, at four corners thereof, connection holes 49a that allow bolt connection to the holding unit 45.

Each first conducting path 48A and each second conducting path 48B are printed on the substrate 49 in such a manner as to secure a large area.

This arrangement can enhance the heat discharging property of the respective first conducting path 48A and the respective second conducting path 48B which tend to experience temperature elevation.

The substrate 49 defines through holes 49b that allow screw fastening that utilizes the screw holes 44a, 44b of the respective connecting terminals 44A, 44B.

With the above, the respective conducting paths 48 for connecting the corresponding connecting terminals 44A, 44B in association with connection of the substrate 49 to the holding unit 45 can be fixed by threading to the connection-target connecting terminals 44A, 44B. As a result, the corresponding connecting terminals 44A, 44B and the conducting paths 48 can be maintained under a stable connected state.

The substrate 49 is supported between the left and right end plates 51.

With the above, it is possible to cause the substrate 49 to function as a reinforcing member for enhancing the shape retainability of the holding unit 45.

As a result, rigidness of the battery unit 41 in the battery pack 9 can be increased.

As shown in FIG. 3 through 5, the battery unit 41 includes a first connector 61 connected to the controller 46 via a wire harness 60, a second connector 62 detachably connected to the first connector 61, and seven detecting paths 63 extending between the respective conducting paths 48A, 48B and the second connector 62. The second connector 62 and the respective detecting paths 63 are provided integrally on the substrate 49.

With the above arrangement, when wiring operations are effected for connecting the controller 46 to the respective conducting paths 48A, 48B, the worker can connect the controller 46 to the respective conducting paths 48A, 48B by connecting the first connector 61 on the controller side to the second connector 62 of the substrate 49.

In the above regard, if e.g. the respective detecting paths 63 were a plurality of wire harnesses connected only to the second connector 62, the worker would have to take the trouble of connecting the respective wire harnesses individually to the respective conducting paths 48A, 48B. Whereas, with the above-described arrangement, the controller 46 and the respective conducting paths 48A, 48B can be connected to each other, without requiring such trouble.

As a result, the working operations in the manufacturing of the battery pack 9 can be made easier.

Each detecting path 63 is a printed wire printed on the substrate 49 to be able to detect a voltage, a current, a temperature, etc. of the respective battery module 44. The second connector 62 is fixed to the substrate 49, with the respective detecting paths 63 being connected to this second connector 62.

As shown in FIGS. 3-4, the battery unit 41 includes a protecting plate 64 for protecting the respective connecting terminals 44A, 44B and the substrate 49 of the respective battery module 44. This protecting plate 64 is formed of resin and has a large area for covering the respective connecting terminals 44A, 44B, etc. from the front side thereof and the protecting plate 64 is fixed to the upper and lower first bridging members 54.

The battery pack 9 includes eight anti-vibration rubbers 65 disposed between the battery case 40 and the battery unit 41 for supporting the battery unit 41 in an anti-vibration manner. The respective anti-vibration rubbers 65 are disposed in distribution at predetermined positions such that four of them appropriately support the bottom of the battery unit 41 from under, two of them appropriately support the front side upper portion of the battery unit 41, and two of them appropriately support the rear upper portion of the battery unit 41 from the rear side, respectively.

Namely, in this battery pack 9, the battery unit 41 is appropriately supported in the anti-vibration manner by the respective anti-vibration rubbers 65 inside the battery case 40. With this arrangement, in case the battery pack 9 is to be attached to or detached from the battery accommodating portion 8 as well as in case the battery pack 9 is to be accommodated in the battery accommodating portion 8, vibration suppression of the battery unit 41 can be effected appropriately.

As a result, it is possible to avoid the risk of vibration at the time of attachment/detachment of the battery pack 9 or during traveling affecting the battery unit 41 adversely.

The battery pack 9 includes four rubber stoppers 66 for restricting movement of the battery unit 41 in the left/right direction within the battery case 40. The respective stoppers 66 are disposed in distribution at left and right upper portions of the battery unit 41.

Other Embodiments Modified from Above Embodiment

The present invention is not limited to the arrangements exemplified in the foregoing embodiment. Some typical other modified embodiments relating to the present invention will be explained next one by one.

[1] In the battery pack 9 exemplified in the foregoing embodiment, twelve battery modules 44 are connected in two in parallel and six in series. The invention is not limited thereto. The number and connecting mode of the battery modules 44 in the battery pack 9 can vary in many ways, depending on e.g. a rated current or rated voltage of an electrically powered motor provided in a work vehicle on which the battery pack 9 is mounted, or a size of the battery accommodating portion 8 in the work vehicle, etc. For instance, in the battery pack 9, six battery modules 44 can be connected in series.

[2] In the case of the battery pack 9 exemplified in the foregoing embodiment, the plurality of conducting paths 48 and the plurality of detecting paths 63 are printed wires provided integrally on the substrate 49 and the second connector 62 also is provided integrally on the substrate 49. However, the invention is not limited thereto. For instance, the plurality of detecting paths 63 can be wire harnesses that extend from the second connector 62 not provided integrally on the substrate 49.

[3] In the case of the battery pack 9 exemplified in the foregoing embodiment, the single large second connector 62 is provided integrally on the substrate 49. The invention is not limited thereto. For instance, in case it is not possible to secure a space for integrally including such large second connector 62 on the substrate 49, a plurality of small second connectors 62 can be provided integrally on the substrate 49.

[4] In the case of the battery pack 9 exemplified in the foregoing embodiment, the controller 46 is supported to the holding unit 45. The invention is not limited thereto. For instance, the controller 46 can be an integrated circuit board integrally assembled with the substrate 49 and the plurality of detecting paths 63 extending between the controller 46 and the respective conducting paths 48 can be printed wires printed on the substrate 49, whereby the controller 46 and the respective detecting paths 63 can be provided integrally on the substrate 49.

With the above-described arrangement, when a worker manufactures the battery pack 9, disposing operation of the controller 46 and the wiring operations for connecting the controller 46 to the respective conducting paths 48 can be eliminated.

As a result, manufacturing of the battery pack 9 can be made even easier.

[5] The plurality of battery modules 44 exemplified in the foregoing embodiment are stacked in the left/right direction. The invention is not limited thereto. For instance, the plurality of battery modules 44 can be stacked in the vertical direction or in the front/rear direction.

[6] The respective battery module 44 exemplified in the foregoing embodiment includes the positive electrode terminal 44A and the negative electrode terminal 44B as the connecting terminals. The invention is not limited thereto. For instance, the respective battery module 44 can include, as the connecting terminals, the positive electrode terminal 44A, the negative electrode terminal 44B and a voltage detecting terminal.

And, in the case of the above arrangement in which the respective battery module 44 includes, as the connecting terminals, the positive electrode terminal 44A, the negative electrode terminal 44B and a voltage detecting terminal, in addition to the plurality of first conducting paths 48A and the plurality of second conducting paths 48B described above, a plurality of third conducting paths for connecting two voltage detecting terminals adjacent each other on the left and right sides, can be provided by means of printing for instance, on the substrate 49.

[7] In the case of the plurality of battery modules 44 exemplified in the foregoing embodiment, these modules 44 are stacked with the respective connecting terminals 44A, 44B being positioned at the front end of the battery unit 41. The invention is not limited thereto. For instance, the plurality of battery modules 44 can be stacked with the respective connecting terminals 44A, 44B being positioned at the rear end of the battery unit 41. Further alternatively, the battery modules 44 with the respective connecting terminals 44A, 44B being positioned at the front end of the battery unit 41 and the battery module 44 with the respective connecting terminals 44A, 44B being positioned at the rear end of the battery unit 41 may be stacked and present in a mixed state.

[8] In the case of the respective battery module 44 exemplified in the foregoing embodiment, laminate type battery cells are stacked. The invention is not limited thereto. For instance, the respective battery module 44 can comprise stacking of cylindrical type battery cells.

Figure 6:
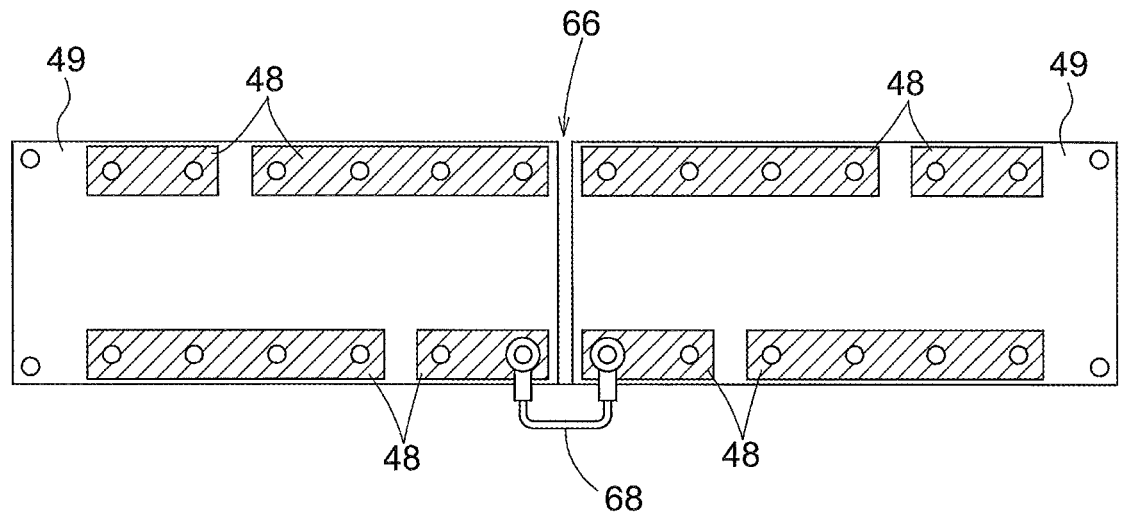
FIG. 6 is a rear view of a substrate according to a further embodiment in which the substrate is divided into two parts in a stacking direction.
Figure 7:
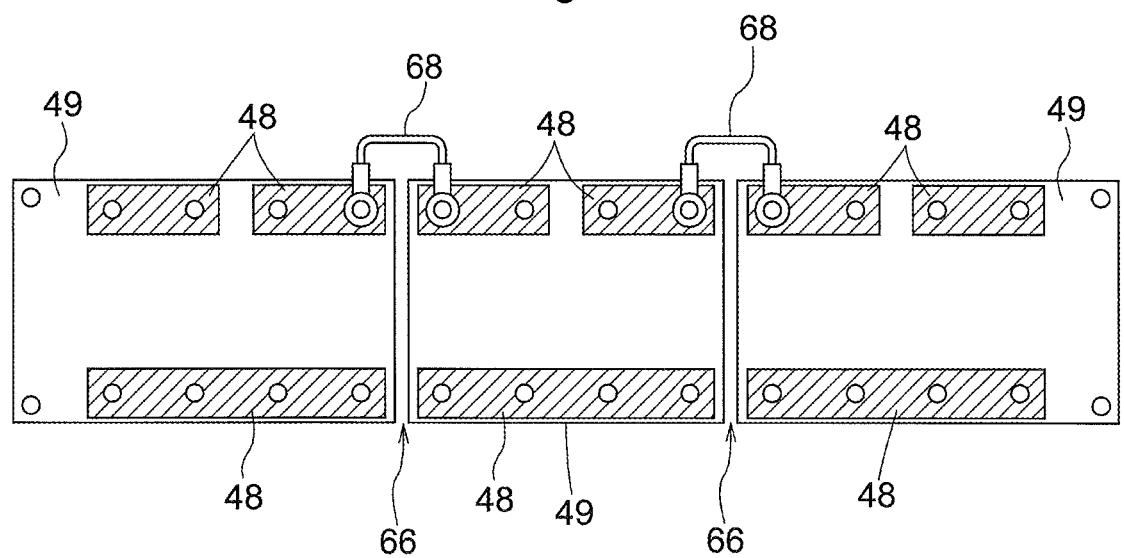
FIG. 7 is a rear view of a substrate according to a further embodiment in which the substrate is divided into three parts in the stacking direction.

[9] The substrate 49 exemplified in the foregoing embodiment comprises an integral component provided between the pair of end plates 51 disposed at opposed ends of the battery modules 44 in their stacking direction. The invention is not limited thereto. For instance, the substrate 49, as shown in FIGS. 6-7, can be divided into a plurality of parts in the stacking direction of the battery modules 44. The substrate 49 shown in FIG. 6 is divided into two parts in the stacking direction of the battery modules 44. The substrate 49 shown in FIG. 7 is divided into three parts in the stacking direction of the battery modules 44.

If this arrangement is applied to a case in which the cell case 44D of the respective battery modules 44 is configured such that the thickness of this cell case 44D in the stacking direction varies according to volume change in the stacking direction associated with charging/discharging of the respective battery cells stacked in the cell case, it is possible to secure a gap 67 for allowing such variation of thickness in the stacking direction of the respective cell case 44D associated with charging/discharging of the respective battery cells (volume change in the stacking direction of the respective battery module 44), at the dividing portion of the substrate 49.

With the above, it becomes possible to avoid risk of occurrence of distortion in the vicinity of the connecting terminals of the respective battery modules 44 having the respective connecting terminals 44A, 44B connected to the respective conducting paths 48 of the substrate 49, due to the thickness variation of the respective cell case 44D in the stacking direction.

Incidentally, as shown in FIG. 6-7, the conducting path 48 which is divided in association with the division of the substrate 49 will be connected via a wire 68.

[10] The substrate 49 exemplified in the foregoing embodiment integrally includes the plurality of conducting paths 48, etc. The invention is not limited thereto. For instance, the substrate 49 can integrally include sensors such as a thermistor, and communication lines connected to the sensors, etc., in addition to the plurality of conducting paths 48.

[11] The battery pack 9 exemplified in the foregoing embodiment is mounted on the electrically powered grass mower. The invention is not limited thereto. For instance, the battery pack 9 can be mounted also on a work vehicle such as an electrically powered or hybrid grass mower, a tractor, a rice planter, a transport vehicle, or a passenger car, etc.

The invention claimed is:

1. A battery pack comprising:
a plurality of battery modules with connecting terminals disposed at predetermined positions;
a holding unit for holding the plurality of battery modules under the stacked state;
a plurality of conducting paths connecting corresponding connecting terminals;
a substrate connected to the holding unit;
a controller for controlling the battery modules;
a first connector connected to the controller via a wire harness;
a single second connector detachably connected to the first connector; and
a plurality of detecting paths extending between the plurality of conducting paths and the single second connector;
wherein the plurality of conducting paths are provided integrally in the substrate and disposed to connect the corresponding connecting terminals in association with connection of the substrate to the holding unit,
wherein the substrate is divided into a plurality of parts in a stacking direction of the battery module, and
wherein each part of the substrate includes at least two rows of conducting paths,
wherein at least one of the rows of conducting paths includes at least one conducting path with more than two connection holes,
wherein at least two of the conducting paths are connected with a wire, and
wherein the plurality of conducting paths are connected to each other by connecting the detecting paths extending from the respective conducting paths to the single second connector.

2. The battery pack of claim 1, wherein:
the holding unit includes a pair of end plates disposed at opposed ends of the battery module in a stacking direction thereof; and
the substrate is provided between the pair of end plates.

3. The battery pack of claim 1,
wherein the second connector and the plurality of detecting paths are provided integrally in the substrate.

4. The battery pack of claim 1, further comprising:
a controller for controlling the battery modules; and
a plurality of detecting paths extending between the controller and the conducting paths;
wherein the controller and the plurality of detecting paths are provided integrally in the substrate.

* * * * *